United States Patent
Peterson et al.

(10) Patent No.: US 10,021,036 B2
(45) Date of Patent: Jul. 10, 2018

(54) MANAGING PERSISTENT COOKIES ON A CORPORATE WEB PORTAL

(71) Applicant: SonicWALL US Holdings Inc., Santa Clara, CA (US)

(72) Inventors: Christopher D. Peterson, Bellingham, WA (US); Jeetendra Kulkarni, Bengaluru (IN)

(73) Assignee: SonicWALL Inc., Milpitas, CA (US)

( * ) Notice: Subject to any disclaimer, the term of this patent is extended or adjusted under 35 U.S.C. 154(b) by 63 days.

(21) Appl. No.: 14/991,567

(22) Filed: Jan. 8, 2016

(65) Prior Publication Data

US 2017/0104687 A1    Apr. 13, 2017

Related U.S. Application Data

(60) Provisional application No. 62/238,579, filed on Oct. 7, 2015.

(51) Int. Cl.

| | |
|---|---|
| *H04L 29/06* | (2006.01) |
| *H04L 12/911* | (2013.01) |
| *H04L 29/12* | (2006.01) |
| *H04L 12/58* | (2006.01) |
| *H04L 29/08* | (2006.01) |
| *H04W 12/08* | (2009.01) |

(52) U.S. Cl.
CPC .............. *H04L 47/70* (2013.01); *H04L 51/12* (2013.01); *H04L 61/1511* (2013.01); *H04L 63/0281* (2013.01); *H04L 63/105* (2013.01); *H04L 63/20* (2013.01); *H04L 67/02* (2013.01); *H04W 12/08* (2013.01)

(58) Field of Classification Search
CPC ... H04L 61/1511; H04L 51/12; H04L 63/0281
See application file for complete search history.

(56) References Cited

U.S. PATENT DOCUMENTS

2014/0089661 A1*  3/2014  Mahadik ............. H04L 61/1511
                                                              713/162

* cited by examiner

*Primary Examiner* — Kyung H Shin
(74) *Attorney, Agent, or Firm* — Polsinelli LLP

(57) ABSTRACT

Systems and methods for management of persistent cookies in a corporate web portal are described. A plurality of zones may be defined and stored in memory. Each zone may be associated with a zone property indicative of whether cookies are allowed. A resource request may be received from a user device over a network where access to the requested resource may require a cookie. The user device may be classified into a zone from the plurality of zones based on the attributes of the user device. The cookie may be automatically installed on the user device based on a zone property for the zone and for those resources that have been configured to require installation of a cookie installed without requiring further user interaction following the request.

18 Claims, 3 Drawing Sheets

MANAGING PERSISTENT COOKIES ON A CORPORATE WEB PORTAL

CROSS-REFERENCE TO RELATED APPLICATIONS

The present application claims the priority benefit of U.S. provisional application No. 62/238,579 filed Oct. 7, 2015 and entitled "Persistent Cookies," the disclosure of which is incorporated herein by reference.

BACKGROUND OF THE INVENTION

1. Field of the Invention

The present invention generally relates to cookies—data generated by a website and saved to a web browser. More specifically, the present invention relates to management of persistent cookies—cookies stored to a hard drive pending an expiration date—in a corporate web portal.

2. Description of the Related Art

There are presently a variety of different web services that may be made available through a corporate web portal. Accessing such web services using an end-user device may require a cookie indicative of certain authentication information (e.g., a token regarding an authentication state). Microsoft® Sharepoint services, for example, allow a user to share information and files across an enterprise. Such services generally require a cookie in order to operate and allow for editing at local applications on a user device.

A cookie is generally installed upon approval by a user of the user device. Such approval may be required before the cookie is allowed to be installed on the user device due to possible privacy or security concerns with respect to the data on and regarding the device. Such a cookie may represent a security risk, however, especially in an enterprise setting. The particular user may not be knowledgeable or otherwise equipped to make a decision that would accord with applicable enterprise security policies as to whether the persistent cookie should be installed. Moreover, the user may not correctly enable or disable the cookie thereby causing problems with accessing files or information, editing the accessed files or information, and saving such edits. Training or having to assist a user to make or deal with such decisions may be costly, time-intensive, and inefficient.

Moreover, in an enterprise setting, it is generally the information technology (IT) professional staff that is responsible for managing security policies. An enterprise may have multiple different security levels for different types of information or files, as well as different policies applicable to each. Because a cookie represents authentication information that allows access to sensitive or otherwise secure information, however, the cookie should only be installed on a device under control of the appropriate authorized end user. Further, when the device is no longer under the control of the end user (e.g., where the device is lost, stolen, sold, or hacked), a cookie that continues to persist may allow for data breaches and other security failures.

There is, therefore, a need in the art for improved systems and methods for management of persistent cookies in a corporate web portal.

SUMMARY OF THE CLAIMED INVENTION

Embodiments of the present invention include systems and methods for management of persistent cookies on a corporate web portal. In a claimed embodiment of the present invention, a plurality of zones defining device capabilities may be defined and stored in memory. Each zone may be associated with a zone property indicative of whether cookies are allowed. A resource request may be received from a user device over a network whereby the resource requires a cookie. The user device may be classified into a zone from the plurality of zones based on the attributes of the user device, and the cookie may be automatically installed on the user device based on a zone property of that zone without requiring further user interaction following the request. As a result, an administrator may determine those applications running on a user device and having certain capabilities are allowed to install persistent cookies.

DETAILED DESCRIPTION

Embodiments of the present invention include systems and methods for management of persistent cookies on a corporate web portal. A plurality of zones defining user device attribute requirements may be defined and stored in memory. Each zone may be associated with a zone property indicative of whether cookies are allowed. A resource request may be received from a user device over a network where access to the requested resource may require a persistent cookie. The user device may be classified into a zone from amongst the plurality of zones based on the attributes of that device. When the device is used to access a resource that requires the cookie, the persistent cookie may be automatically installed on the user device based on both the attributes of the resource and the zone property of the zone into which the user device has been classified. The foregoing may occur without requiring further user interaction following the request.

Figure 1:
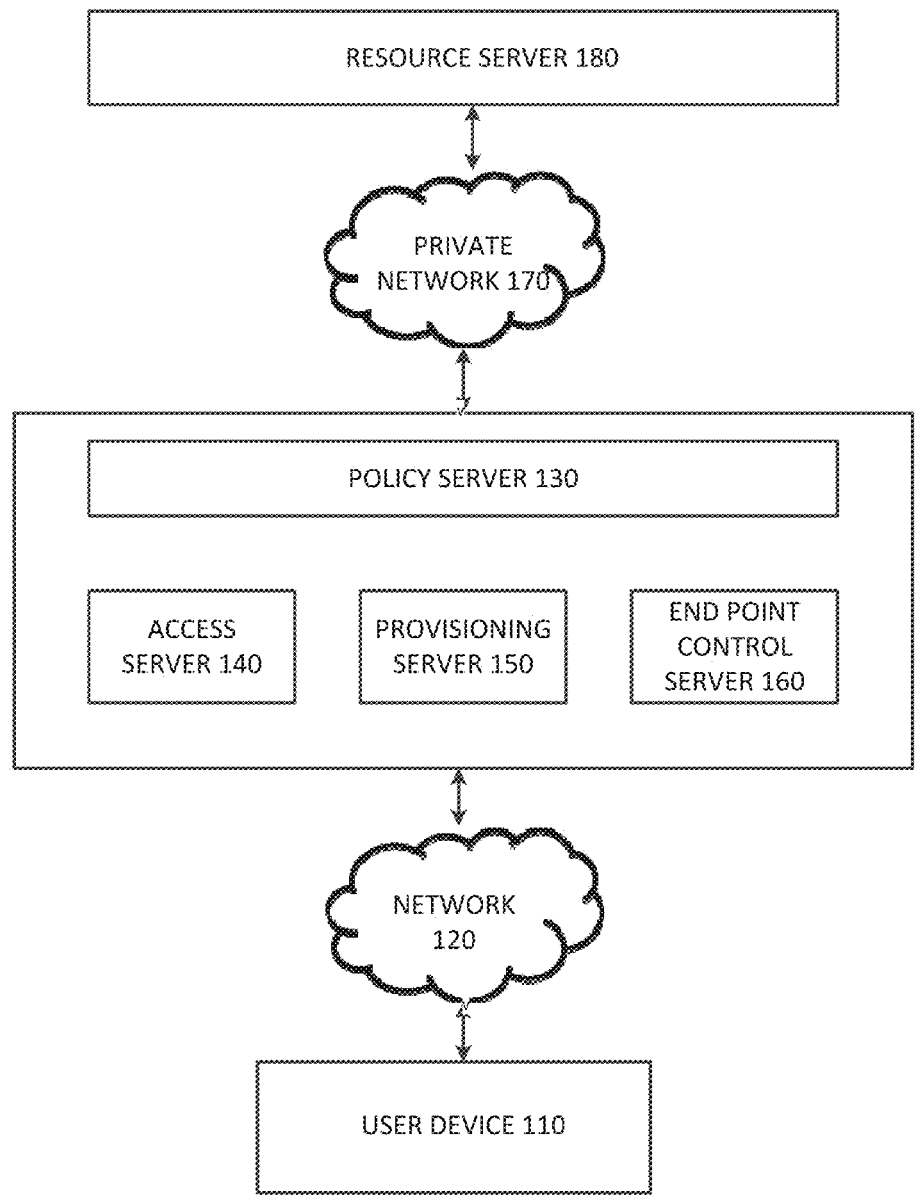
FIG. 1 illustrates a network environment in which a system for management of persistent cookies in a corporate web portal may be implemented.

FIG. 1 illustrates a network environment in which a system 100 for management of persistent cookies in a corporate web portal may be implemented. Such a network environment may include a server system 100 in communication with one or more user devices 110 through a network 120 as well as in communication with resource server 180 through private network 170. Server system 100 may include a policy server 130, an access server 140, a provisioning server 150, and an end-point-control server 160.

User device 110 may be any number of different controllers or electronic user devices. Such devices include general purpose computers, mobile phones, smartphones such as iPhones, Microsoft Mobile Phones, and Android devices, portable or handheld computing devices including laptops, tablets, and phablets, desktop work stations, or any other type of computing device capable of communicating over a communication network (wired or wireless) including those operating as a part of the Internet of Things (IOT Devices).

The user device 110 may also be configured to access data from other storage media, such as memory cards or disk drives as may be appropriate in the case of downloaded services. The user device 110 may also include standard hardware computing components such as network and media interfaces, non-transitory computer-readable storage (memory), and processors for executing instructions that may be stored in memory. User device 110 may implement some or all of the components illustrated in the context of FIG. 3.

Network 120 may include a local, proprietary network such as a corporate or institutional intranet and may also be a part of a larger wide-area network such as the Internet. The communication network may be a local area network (LAN) that can in turn be communicatively coupled to a wide area network (WAN) such as the aforementioned Internet. The Internet is generally understood as a broad network of interconnected computers and servers allowing for the transmission and exchange of data between users connected through network service providers.

Examples of network service providers are the public switched telephone network, a cable service provider, a provider of digital subscriber line (DSL) services, or a satellite service provider. Wireless networks as made available through one or more wireless access points and utilizing any number of communications protocols may also constitute a service provider. Such networks may utilize the likes of IEEE 802.11 (WiFi), IEEE 802.15 (Bluetooth), or emerging transmission protocols such as LiFi, which utilizes LEDs and photo diodes. Wireless networks may include a wired backhaul component and can operate in mesh and ad hoc configurations. Communication networks also allows for communication between the various components of the network environment.

Policy server 130 determines the conditions under which a user of the user device 110 may obtain the requested resources. Policy server 130 also determines the capabilities and properties of those resources including whether a resource requires a persistent cookie. The policy server 130 administers policy rules specifying the conditions under which a user may obtain a requested resource. These conditions may include information regarding the user and regarding the user device 110. The policy server 130 also may validate authentication credentials submitted by a user with a request to obtain resources from the server system 100.

The policy server 130 may include or have access to user credentials, device profiles, and security rules. Such information may be maintained in a database or other data store accessible by policy server 130. Upon receipt of credential and profile information from a user of user device 110 and a corresponding request to access or use resources, the policy server 130 may compare the received information to the stored credentials and profile information for the user. Such stored information may further be associated with certain rules governing what resources are available to the user and the properties of those resources such as whether a persistent cookie is needed and authorized. Such determinations and authorizations may be implemented by IT staff. The policy server 130 may therefore evaluate the rules to determine whether the user device 110 should be allowed access to the requested resources. Policy server 130 further determines if those resources require a persistent cookie to be stored on the user device 110.

Access server 140 may be any device or combination of devices that provides a gateway to the remainder of the server system 100 or other resource servers 180. Access server 140 may be responsible for establishing both secure and unsecured communication channels with the user device 110. The user device 110 may use an unsecured communication channel to contact the access server 140. The access server 140 may then respond to the user device 110 with information regarding establishment of a secure communication channel and the manner in which this may be done.

In reply, the user device 110 may request that the access server 140 establish a secure communication channel for the user device 110 to obtain the requested resource. The access server 140 can then use an encrypted communication protocol to create a secure communication channel between the user device 110 and the server system 100. In some embodiments of the invention, access server 140 may be a Virtual Private Network (VPN) server or application.

In this regard, the user device 110 may contain special-purpose software for establishing a secure connection with the server system 100 through the access server 140. For example, the access server 140 may be configured to cooperate with software resident on the user device 110 to create a VPN secure communication session between the user device 110 and the server system 100 using secure encryption communication protocols. Such protocols include but are not limited to the Secure Sockets Layer (SSL) protocol or the Internet Protocol Secure (IPSec) protocol.

With other applications, a user may employ a general purpose software application on the user device 110, such as a browser application, to establish a secure connection to the server system 100 through the access server 140. For example, a user may attempt to employ a browser application on the user device 110 such as Microsoft Internet Explorer or Mozilla. The user may utilize the browser application to access a Universal Resource Locator (URL) address in the server system 100. The access server 140 may thus be configured to use appropriate secure communication protocols such as the Secure Hypertext Transfer Protocol (HTTPS) to establish secure communication with a user device 110 using such a general purpose software application.

The access server 140 may include multiple components, or multiple servers, and may each or individually handle multiple communication techniques. In some embodiments, the access server 140 may maintain the secure communication channel with the user device 110. With other embodiments, however, the access server 140 may establish the secure communication channel.

Provisioning server 150 and end-point-control server 160 assist the policy server 130 with enforcement of the access rules. For example, the provisioning server 150 and the end-point-control server 160 cooperate to interrogate the user device 110 to detect the presence of desired or undesired process objects or attributes. Further, depending upon the rules stored in memory, the provisioning server 150 and the end-point-control server 160 may cooperate to install and activate desired objects on the user device 110.

If a rule requires that the user device 110 have a specific portfolio of security process objects installed and operational, then the provisioning server 150 and the end-point-control server 160 may cooperate to install and activate one or more of those security process objects on the user device 110. The provisioning server 150 and the end-point-control server 160 can determine if the user device 110 is capable of executing a communication process object that may implement a more preferred or alternate communication technique. With t such an embodiment, the provisioning server 150 and the end-point-control server 160 may cooperate to install and activate one or more such communication process objects on the user device 110, as well as remove, alter, or isolate any undesirable objects from the user device 110.

The servers described above may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. Certain componentry as illustrated and described in FIG. 3 may be a part of such a server device.

Figure 2:
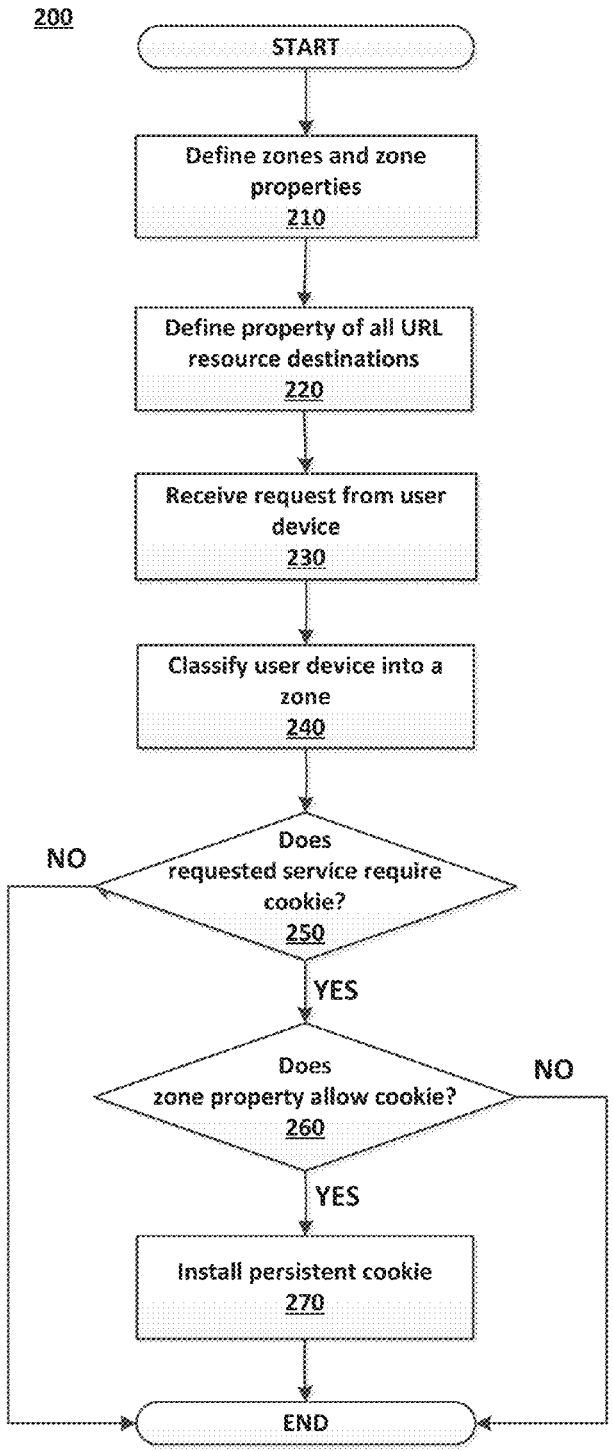
FIG. 2 is a flowchart illustrating a method for management of persistent cookies in a corporate web portal.

FIG. 2 is a flowchart illustrating a method for management of persistent cookies in a corporate web portal. The method of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In step 210, one or more zones may be defined, as well as the properties of each zone. In order to allow an administrator to simultaneously specify a variety of user devices 110 (and operating environments thereof) for a rule, multiple types of user devices 110 may be categorized into a "zone of trust." A "zone of trust" or "zone" is an assertion of state on a user device 110. A policy rule may determine the availability of a resource based upon the zone into which the user device may fall. A zone may be defined based on the identity of the user, as well as attributes and capabilities of the user device 110.

The definition of a zone and its properties may be used as the basis for one or more policy rules. For example, a policy rule may specify that a user may access a resource when his or her user device 110 can be categorized into zone of trust 1 (e.g., corporate owned device) or zone of trust 2 (e.g., personal device), but may be refused access if his or her user device 110 is categorized into zone of trust 3 (e.g., public kiosk). Another policy rule may then specify that a different user, user B, can only obtain that same resource if his or her user device 110 is categorized in zone of trust 1.

User devices 110 may be categorized into zones based on various attributes relevant to security such as whether the user devices are corporate-owned or personal devices and public (e.g., kiosk) or private devices. An IT administrator may also define rules and properties that may be stored at policy server 130 and that concern whether certain zones are allowed to install a persistent cookie. For example, a rule may reflect that corporate owned devices may be allowed to automatically install persistent cookies while public kiosks are blocked from installing persistent cookies. A similar rule or some variant of the same may be implemented with the likes of a personal device.

In step 220, the uniform resource locator (URL) destination of an enterprise's resources may be associated with a property indicative of a requirement for special processing (e.g., the present of a persistent cookie). Each available resource would be identifiable to the server system 100 as to whether a persistent cookie is required. As such, when a resource is requested (e.g., via its associated URL), server system 100 would be able to identify, via the defined property, whether the requested resource may require installation of a persistent cookie.

In step 230, a user device 110 may send a request for a resource or service via network 120 to server system 100, and, in step 240, the requesting user device 110 may be classified into a zone. The provisioning server 150 and the end point control server 160 may cooperate to interrogate a user device 110 and, if necessary, to provision the user device 110 with specified security objects (e.g., persistent cookies). The tools employed by provisioning server 150 and the end point control server 160 to interrogate the user device 110 regarding its attributes can be varied.

The attributes of the user device 110 may be referred to as a signature. This signature may include a list of pre-existing static process objects or artifacts on the user device 110. The signature may also include processes or agents running on the user device 110. The information in the signature can be used to determine the identity of the user device 110. For example, an administrator for a corporate-managed server system 100 may expect all corporate-owned computers to be configured with a particular set of artifacts and agents. Likewise, the administrator may expect a responsible employee to ensure that his or her personal computer is configured with a different set of particular artifacts and agents. On the other hand, the administrator may expect a computer provided in a public kiosk to have only a minimal set of artifacts and agents. Accordingly, the end point control server 160 may use the signature of a user device 110 to distinguish a corporate-owned computer from a personal computer owned by an employee of the company from a computer at a public kiosk. The identity inherently provided by the signature may then subsequently used to classify the user device 110 into a zone.

The policy server 130 may maintain a global list of signatures. An administrator can therefore select one or more signatures from this global list to define or redefine a zone of trust, such as performed in step 210. The client state defining a zone of trust is, as previously described, a combination of the static and dynamic state—the signature—existing on the client device prior to instantiating an authenticated secure communication session and the dynamic state added to the client during the lifecycle of the authenticated secure communication session. State assertions that are added to the user device 110 during the authenticated secure communication session may also be expressed as individual literals in a zone of trust definition. Like the signature definitions, a definition of a zone of trust may be created as a Boolean logic expression of literals that conform to the standard Conjunctive Normal Form (CNF).

The policy server 130 also may provide literals for client inventory agents, data protection agents, and patch management agents. Client inventory agents search for artifacts on the client. They may be used, for example, to determine the signature of the client. These agents may, in some instances, not be included in signature or zone of trust definition; one or more agents of this type may instead be provisioned on the client in advance of determining a client signature or zone of trust. Data protection agents protect data being used in authenticated secure communication sessions from being disclosed to parties other than the authenticated session user. Patch management agents manage client system patches, in order to ensure that, where possible, security holes have been repaired by software vendors.

In addition to one or more zones of trust that specify a particular signature, the list of zones may include a default zone that does not require a specific signature. Thus, if the user device 110 fails to match any other zone of trust, its operating environment will be matched with this zone of trust by default. This zone of trust may still require that the user device 110 be provisioned with one or more additional process objects.

The provisioning server 150 may install an interrogator agent onto the user device 110 in order to ascertain further information regarding the user device 110. The end point control server 160 can also program this interrogator agent with a specific manifest of artifacts to search for on the user device 110 that correspond only to the zones of trust in which the user device 110 can be categorized. That is, the post-authentication interrogator agent will not need to search for the artifacts and agents included in every defined zone of trust; only for those zones of trust that may be applicable to that user device 110. The interrogation results returned from this interrogator agent may then be used to classify the user's user device 110 into a specific zone of trust according to the logic previously described.

Once the user of the user device 110 has been authenticated and the user device 110 categorized into a zone of trust, the policy server 130 will determine whether the user device 110 may obtain a particular resource based upon a policy rule. With various embodiments of the invention, the makeup and use of policy rules may have some additional usefulness outside the scope of end point control.

From the perspective of the end point control server 160, a policy rule represents the enforcement mechanism of a zone of trust. In order for the client operating environment to be factored into a security policy, it must be associated with a policy rule. The policy server 130 may provide for hierarchical and other forms of aggregating zones in a policy rule definition.

In step 250, policy server 130 may determine whether the resource or service requested by the user device 110 requires a persistent cookie. Such determination may be based on whether the URL destination of the requested service or resource is associated with a property indicative of a need for a persistent cookie. If so, the method may proceed to step 260.

In step 260, a determination may be made by the policy server 130 as to whether the zone into which the user device 110 has been classified is allowed to install a persistent cookie. Such determination may be based on the particular zone properties associated with the zone and defined in step 210. If the zone property allowed for installation of a persistent cookie, the method may proceed to step 270 where the persistent cookie is automatically installed without further approval by the user of the user device 110. Where approval by the user may be required, such approval may have been requested in conjunction with or as a part of an end user license agreement (EULA). As such, persistent cookies may be automatically created and installed as needed and without requiring user interaction for each cookie installed on devices identified as company-owned. Such a property may likewise avoid creating or installing cookies where none may be required.

Figure 3:
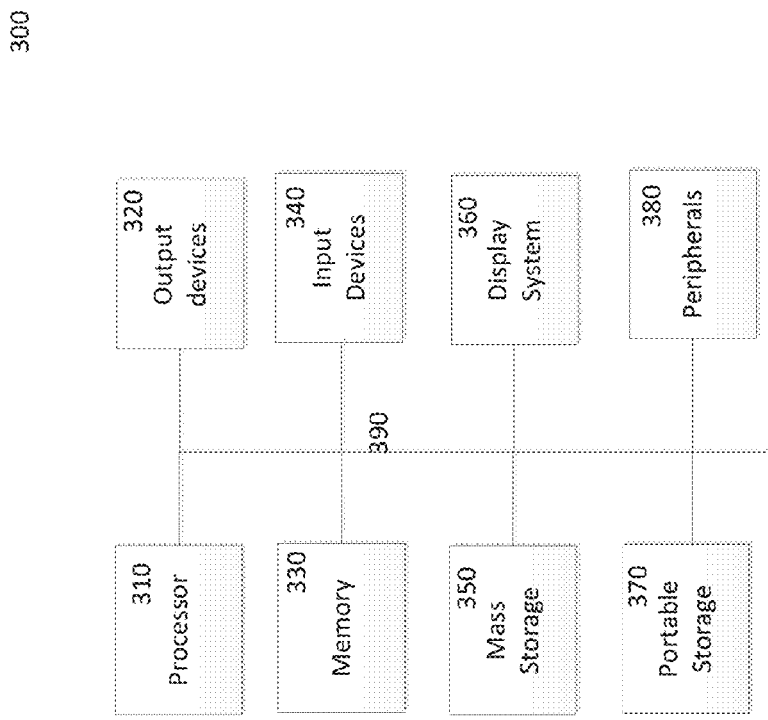
FIG. 3 illustrates a computing system that may be used to implement an embodiment of the present invention.

FIG. 3 illustrates a computing system 300 that may be used to implement an embodiment of the present invention. The computing system 300 as illustrated in FIG. 3 includes one or more processors 310 and memory 330. Main memory 330 stores, in part, instructions and data for execution by a processor device 310. Main memory 330 can store the executable code when in operation. The system as illustrated in FIG. 3 further includes a mass storage device 350, portable storage medium drive(s) 370, output devices 320, user input devices 340, a display system 360, and peripheral devices 380.

The components shown in FIG. 3 are depicted as being connected via a single bus 390. The components may, however, be connected through one or more data transport means. For example, processor unit 310 and main memory 330 may be connected via a local microprocessor bus, and the mass storage device 350, peripheral device(s) 380, portable storage device 370, and display system 360 may be connected via one or more input/output (I/O) buses.

Mass storage device 350 of FIG. 3 may be implemented with a magnetic disk drive or an optical disk drive. Mass storage device 350 is a non-volatile storage device for storing data and instructions for use by processor unit 310. Mass storage device 350 can store the system software for implementing embodiments of the present invention for purposes of loading that software into main memory 330.

Portable storage device 370 operates in conjunction with a portable non-volatile storage medium such as a compact disk or digital video disc to input and output data and code to and from the computer system 300 of FIG. 3. The system software for implementing embodiments of the present invention may be stored on such a portable medium and input to the computer system via the portable storage device 370.

Input devices 340 provide at least a portion of a user interface. Input devices 340 may include an alpha-numeric keypad, such as a keyboard, for inputting alpha-numeric and other information. Input device 340 may also or alternatively include a pointing device such as a mouse, a trackball, stylus, or cursor direction keys. Input devices 340 may also include touch sensitive, multi-touch, and/or force sensitive interfaces. The system as shown in FIG. 3 also includes output devices 320. Examples of output devices 320 include speakers, printers, network interfaces, and monitors. Display system 360 may include a liquid crystal display (LCD) or other display such as that found on a mobile device. Display system 360 receives textual and graphical information and outputs for review and comprehension. In some embodiments—such as a mobile device—various aspects of input device 340, output device 320, and display 360 may be integrated as exemplified by a touch sensitive display screen.

Peripherals 380 may include any type of computer support device to add additional functionality to the computer system 300. For example, peripheral device(s) 380 may include a modem or a router. Other storage devices may be implemented or introduced to the computing device of FIG. 3 by way of a peripheral device 380 or associated interface.

The components contained in the computer system 300 of FIG. 3 are those typically found in computer systems that may be used with embodiments of the present invention and are intended to represent a broad category of such computer components that are well known in the art. Thus, the computer system of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, iOS, Android, and Palm OS. While not expressly illustrated, the computing device of FIG. 3 may have various communicative capabilities as made possible by network interfaces, which may be wired or wireless.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for management of installation of persistent cookies on user devices accessing internal resources through a corporate web portal, the system comprising:
   a plurality of network computing devices, wherein the plurality of network computing devices include:
      a policy server that stores in memory:
         definitions for a plurality of zones, each zone definition associated with a type of user device, the type of user device based on a set of user device capabilities and attributes each zone associated with a zone property indicative of whether persistent cookies are allowed to be installed on the associated type of user device, and
         policy rules each specifying that a type of user device associated with a zone is allowed to access a resource;
      an access server that receives a resource request from a user device, wherein access to the requested resource requires a persistent cookie to be installed on the user device; and
      a provisioning server that:
         classifies the user device into a zone from the plurality of zones based on attributes of the user device corresponding to a type of user device allowed to access the resource according to one of the policy rules associated with the associated zone, and
         sends the cookie for installation on the user device based on a zone property of the zone into which the user device is classified, wherein the zone property indicates that the user device is allowed to install persistent cookies, and wherein the user device then is allowed to access the resource.

2. The system of claim 1, wherein the policy server further stores information regarding the requested resource, wherein a uniform resource locator (URL) of the requested resource is associated with a property indicating that a cookie is required.

3. The system of claim 2, wherein installation of the cookie by the provisioning server is further based on the URL of the requested resource being associated with the property indicating that the cookie is required.

4. The system of claim 2, wherein the user device requests a second resource associated with a property indicating that no cookie is required, and wherein the provisioning server does not install any cookie in response to the request for the second resource.

5. The system of claim 1, wherein the plurality of zones is based on attributes of the user device, and wherein the attributes include enterprise ownership, personal ownership, or public device.

6. The system of claim 1, wherein the provisioning server automatically installs the cookie without further user interaction following the request.

7. A method for management of installation of persistent cookies on user devices accessing internal resources through a corporate web portal, the method comprising:
   storing in memory:
      definitions for a plurality of zones in memory, wherein each zone definition associated with a type of user device, the type of user device based on a set of user device capabilities and attributes, each zone associated with a zone property indicative of whether persistent cookies are allowed to be installed on the associated type of user device, and
      policy rules each specifying that a type of user device associated with a zone is allowed to access a resource;
   receiving a resource request from a user device over a network, wherein access to the requested resource requires a persistent cookie to be installed on the user device;
   executing instructions stored in memory, wherein execution of the instructions by the processor classifies the user device into a zone from the plurality of zones based on attributes of the user device corresponding to a type of user device allowed to access the resource according to one of the policy rules associated with the associated zone; and
   sending the cookie for installation on the user device based on a zone property of the zone into which the user device is classified, wherein the zone property indicates that the user device is allowed to install persistent cookies, and wherein the user device then is allowed to access the resource.

8. The method of claim 7, further comprising storing information regarding the requested resource, wherein a uniform resource locator (URL) of the requested resource is associated with a property indicating that a cookie is required.

9. The method of claim 8, wherein installing the cookie is further based on the URL of the requested resource being associated with the property indicating that the cookie is required.

10. The method of claim 8, further comprising receiving from the user device a request for second resource associated with a property indicating that no cookie is required, wherein no cookie is installed in response to the request for the second resource.

11. The method of claim 7, wherein the plurality of zones is based on attributes of the user device, and wherein the attributes include enterprise ownership, personal ownership, or public device.

12. The method of claim 7, wherein the installing the cookie is performed automatically without further user interaction following the request.

13. The non-transitory computer-readable storage medium of claim 7, the program further executable to store information regarding the requested resource, wherein a uniform resource locator (URL) of the requested resource is associated with a property indicating that a cookie is required.

14. The non-transitory computer-readable storage medium of claim 13, wherein installing the cookie is further based on the URL of the requested resource being associated with the property indicating that the cookie is required.

15. The non-transitory computer-readable storage medium of claim 13, the program further executable to receive from the user device a request for second resource associated with a property indicating that no cookie is required, wherein no cookie is installed in response to the request for the second resource.

16. The non-transitory computer-readable storage medium of claim 13, wherein the plurality of zones is based on attributes of the user device, and wherein the attributes include enterprise ownership, personal ownership, or public device.

17. A non-transitory computer-readable storage medium, having embodied thereon a program executable by a processor to perform a method for management of installation of persistent cookies on user devices accessing internal resources through a corporate web portal, the method comprising:
    storing:
        definitions for a plurality of zones in memory, wherein each zone definition associated with a type of user device, the type of user device based on a set of user device capabilities and attributes, each zone associated with a zone property indicative of whether persistent cookies are allowed to be installed on the associated type of user device, and
        policy rules each specifying that a type of user device associated with a zone is allowed to access a resource;
    receiving a resource request from a user device over a network, wherein access to the requested resource requires a persistent cookie to be installed on the user device;
    classifying the user device into a zone from the plurality of zones based on attributes of the user device corresponding to a type of user device allowed to access the resource according to one of the policy rules associated with the associated zone; and
    sending the cookie for installation on the user device based on a zone property of the zone into which the user device is classified, wherein the zone property indicates that the user device is allowed to install persistent cookies, and wherein the user device then is allowed to access the resource.

18. The method of claim 17, wherein the cookie is installed automatically without further user interaction following the request.

* * * * *